US012453924B2

(12) United States Patent
Mehat et al.

(10) Patent No.: US 12,453,924 B2
(45) Date of Patent: Oct. 28, 2025

(54) GAME PLATFORM USING ZERO-COPY DATA TRANSFER

(71) Applicant: GOOGLE LLC, Mountain View, CA (US)

(72) Inventors: Sanjeet S. Mehat, Seattle, WA (US); Erin Hoffman-John, Palo Alto, CA (US); Bradley Richard McKee, San Mateo, CA (US); Alan Merzon, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 215 days.

(21) Appl. No.: 18/040,519

(22) PCT Filed: Aug. 3, 2020

(86) PCT No.: PCT/US2020/044754

§ 371 (c)(1),
(2) Date: Feb. 3, 2023

(87) PCT Pub. No.: WO2022/031263

PCT Pub. Date: Feb. 10, 2022

(65) Prior Publication Data

US 2024/0009555 A1 Jan. 11, 2024

(51) Int. Cl.
*A63F 13/352* (2014.01)
*A63F 13/70* (2014.01)

(52) U.S. Cl.
CPC ............ *A63F 13/352* (2014.09); *A63F 13/70* (2014.09)

(58) Field of Classification Search
CPC ............................... A63F 13/352; A63F 13/70
See application file for complete search history.

(56) References Cited

U.S. PATENT DOCUMENTS

| | | | |
|---|---|---|---|
| 7,769,905 | B1 | 8/2010 | Chu et al. |
| 2012/0184354 | A1 | 7/2012 | Brosnan et al. |
| 2014/0149981 | A1 | 5/2014 | Luxenberg et al. |

OTHER PUBLICATIONS

Summarized Translation of The Second Office Action mailed Dec. 25, 2024 for Chinese Application No. 202080104256.0, 10 pages.
Communication Pursuant to Article 94(3) EPC mailed Dec. 5, 2024 for EP Application No. 20758396.4, 10 pages.
(Continued)

*Primary Examiner* — Reginald A Renwick

(57) ABSTRACT

A game platform manages, on behalf of a game program, platform nodes used to execute game operations, such as physics operations, artificial intelligence operations, and player messaging operations. Via the game platform, the game program can implement relatively sophisticated and complex game operations. The game platform can implement each game operation at a corresponding platform node, wherein the platform node employs associated hardware to execute the game operation. The game platform can distribute the platform nodes at different sets of hardware resources, such as different servers, different hardware accelerators, and the like, and thereby implement more sophisticated game operations than can be implemented by the game program directly. The game platform communicates data between the game program and the platform nodes using a zero-copy transfer technique, thereby transferring data with relatively little latency.

20 Claims, 5 Drawing Sheets

(56) References Cited

OTHER PUBLICATIONS

Neeser, F.D. et al., “SoftRDMA: Implementing iWARP Over TCP Kernel Sockets”, J. Res. & Dev., vol. 54, No. 1, Jan./Feb. 2010, 16 pages.
Shivam, Piyush et al., “EMP: Zero-copy OS-bypass NIC-driven Gigabit Ethernet Message Passing”, Association for Computing Machinery, Nov. 2001, 8 pages.
International Preliminary Report on Patentability mailed Feb. 16, 2023 for PCT Application No. PCT/US2020/044754, 9 pages.
Translation of Chinese Office Action mailed Jun. 24, 2024 for CN Application No. 202080104256.0, 22 pages.
Summarized Translation of The Third Chinese Office Action mailed Apr. 22, 2025 for CN 202080104256.0, 2 pages.
Translation of Notification for Patent Registration Formalities mailed Jul. 1, 2025 for CN Application No. 202080104256.0, 4 pages.
International Search Report and Written Opinion mailed May 12, 2021 for corresponding International Application No. PCT/US2020/044754, 15 pages.
Jurgelionis, A. et al., “Platform for Distributed 3D Gaming”, Hindawi Publishing Corporation International Journal of Computer Games Technology, vol. 2009, Article ID 231863; doi: 10.1155/2009/231863; Jun. 16, 2009; 15 pages.
Thadani, M. et al., “An Efficient Zero-Copy IU/O Framework for UNIX”, retrieved from the Internet on Apr. 19, 2021: URL: https://ad.acm.org/doi/pdf/10.5555/947947; May 1, 1995; 19 pages.
Vattipally, S. “Measurement and Enhancement of Cloud-based Online Gaming Systems”, retrieved from the Internet on Apr. 19, 2021: URL: https://core.ac.uk.download/pdf/211348122.pdf; Jul. 1, 2017, 61 pages.

GAME PLATFORM USING ZERO-COPY DATA TRANSFER

CROSS-REFERENCE TO RELATED APPLICATIONS

The present application is a U.S. National Stage under 35 U.S.C. § 371 of International Patent Application Serial No. PCT/US2020/044754, entitled "GAME PLATFORM USING ZERO-COPY DATA TRANSFER" and filed on Aug. 3, 2020, the entirety of which is incorporated by reference herein.

BACKGROUND

A video game system, such as a game console, desktop computer, or smartphone, executes a game program that, via its execution, allows a user to interact with a game environment, such as a virtual world. To provide immersivity in the game environment and to provide a satisfactory user experience, game programs have become increasingly sophisticated, implementing operations such as complex physics calculations to represent realistic movement of game objects, artificial intelligence operations to govern the behavior of game characters, player messaging operations to allow different game players to communicate, and the like. However, the sophistication of these operations is typically limited by the fixed nature of the hardware executing the game program. For example, a game program may be executed by a video game system with relatively old hardware, or by hardware that was not designed to support sophisticated game operations. Accordingly, it can be difficult to implement these sophisticated game operations while still providing a satisfactory user experience.

SUMMARY

The proposed solution in particular relates to a method, comprising receiving a first message from an executing game program, the first message comprising first game data; and providing the first data to a first node of a game platform via a first zero-copy (data) transfer, the first node associated with a first game operation. In some embodiments, the game platform may thus communicate first data between a game program and a first platform node using a zero-copy transfer technique, thereby transferring data with relatively little latency.

In this context the proposed solution may allow for implementing an improved game platform that, on behalf of a game program, manages platform nodes used to execute game operations, such as physics operations, artificial intelligence operations, and player messaging operations, and may also effectively coordinate different operations at distributed hardware resources. Physics operations may relate to operations associated with a physics engine, such as simulation of fluid dynamics, rigid body dynamics, soft body dynamics, or other physical systems, or any combination thereof. AI operations may, for example, relate to employing one or more machine learning models to generate aspects of game behavior, such as dialog responses, non-player character behaviors, simulated behavior of a human player, and the like, and player messaging operations may, for example, relate to operations associated with an in-game player chat system (e.g., a voice chat system), an in-game texting system, and the like, or combination thereof.

Via the game platform, the game program can implement relatively sophisticated and complex game operations, thereby improving the user experience with the game program itself. In particular, the game platform can implement each game operation at a corresponding platform node (including the first node of the game platform and thus a first platform node), wherein the platform node employs associated hardware to execute the game operation. The game platform can distribute the platform nodes at different sets of hardware resources, such as different servers, different hardware accelerators, and the like, and thereby implement more sophisticated game operations than can be implemented by the game program directly. Furthermore, as the demands of the game program for game operations grow (e.g., such as when new players are added to a game session), the game platform can instantiate new platform nodes to support the additional demands, thereby scaling the hardware resources used by the game program according to game demands. Using the proposed zero-copy transfer technique, the game platform provides a scalable way for a game program to employ more sophisticated game operations without requiring the game program to manage the relatively high overhead required to efficiently implement these more sophisticated operations.

To illustrate, a game program may require relatively complex physics calculations to implement portions of the corresponding game. Conventionally, a game program implements the physics calculations via a software library referred to as a physics engine. The physics engine is typically part of the game program itself or is a library with functions that are called by the game program itself. The physics engine is configured to execute at a specified set of hardware resources. Accordingly, the sophistication of the physics calculations, such as the number of calculations, the complexity of each calculation, and the like, is limited by the set of hardware resources for which the physics engine has been designed. These limitations in turn limit aspects of the game program itself, such as the number of players that the game program can support, the number of objects the game program can draw for a display frame, the complexity of the rules that can be implemented by the game program, and the like. In contrast, a game platform employing the techniques described herein can implement the physics engine as a platform node, and the platform node can be implemented via a scalable set of hardware resources, such as at one or more servers dedicated to the game platform. The game platform thereby supports more complex physics operations than can be implemented conventionally. Further, the game platform manages the platform nodes, including configuring and scaling the platform nodes according to program demands, thereby offloading management of the game operations associated with the physics engine from the game program.

Distributing implementation of game operations among different hardware resources, such as different servers, can result in latencies that negatively impact the user experience. For example, latencies resulting from communicating data between the game program and a platform node at a distributed hardware resource can delay generation of image frames associated with the game, and these delays can be noticeable to the user, thereby negatively impacting the user's experience with the game. To reduce such latencies, the game platform can transfer data between the game program and the platform nodes using a zero-copy transfer technique. Using this technique, data is provided from a sender (e.g., the game program) to a receiver (e.g., a first platform node) without creating a separate copy of the data for the receiver. The data can therefore be communicated with relatively little latency (e.g., with sub-frame latency), thereby preventing delays in frame generation and improving the user experience.

In an exemplary embodiment, the game platform may assign ownership to the first node to access a first buffer in order to transfer data via a zero-copy transfer. To initiate the zero-copy transfer the data to be transferred may be previously stored at the first buffer. Additionally, the game platform may prevent access by the game program to the first buffer while the (first) node to the data is to be transferred executes the first game operation with the first game data. The game platform may thus, for example, change the owner of the first buffer to the first platform node and prevent the game program from writing any further data to the first buffer while the first buffer is owned by the first platform node. The first message data is thereby transferred to the first platform node without making a separate copy of the first data, thereby reducing communication latency.

In an exemplary embodiment, the method may further comprise providing the first data to a second node of the game platform via a second zero-copy transfer, the second node associated with a second game operation different from the first game operation. In this context, the second zero-copy transfer may comprise the game platform assigning ownership to the second node to access the first buffer. An embodiment of the proposed solution may thus allow for transferring data between different, for example first and second, nodes of the game platform via zero-copy transfers in order to provide data distribution among the nodes with little latency.

A second message from the executing game program may for example comprise second game data, wherein the second data is then provided to a second node of the game platform via a second zero-copy transfer, the second node associated with a second game operation. In such an embodiment, the game platform may transfer different data to different platform nodes via zero-data copies and thus little latency depending on the game operation to be performed. Each platform node may for example configured to perform a different class of game operations, such as physics engine operations, artificial intelligence and player messaging operations.

An aspect of the claimed solution relates to instantiating a plurality of game operation nodes at the game platform including the first node, each of the plurality of game operation nodes associated with a different game operation, and, in response to receiving at the game platform, from the game program, the first message including the first data, transferring the first data to the first node of the plurality of game operation nodes via the first zero-copy transfer.

In an exemplary embodiment, a second node of the plurality of game operation nodes may just be instantiated in response to the first message.

The proposed solution further relates to a non-transitory computer readable medium embodying a set of executable instructions, the set of executable instructions to manipulate at least one processor to perform a proposed method.

Further, the proposed solution relates to game platform, comprising at least one processor and at least one memory embodying a set of executable instructions, the set of executable instructions to manipulate at least one processor to perform a proposed method. In an exemplary embodiment, a game platform is thus proposed supporting execution of a game program and managing communications between the game program and platform nodes associated with the game platform, wherein the game platform is configured to receive a first message from the executing game program, the first message comprising first game data, and the game platform is configured to provide the first data to a first one of the platform nodes via a first zero-copy transfer, the first platform node being associated with a first game operation for the game program.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
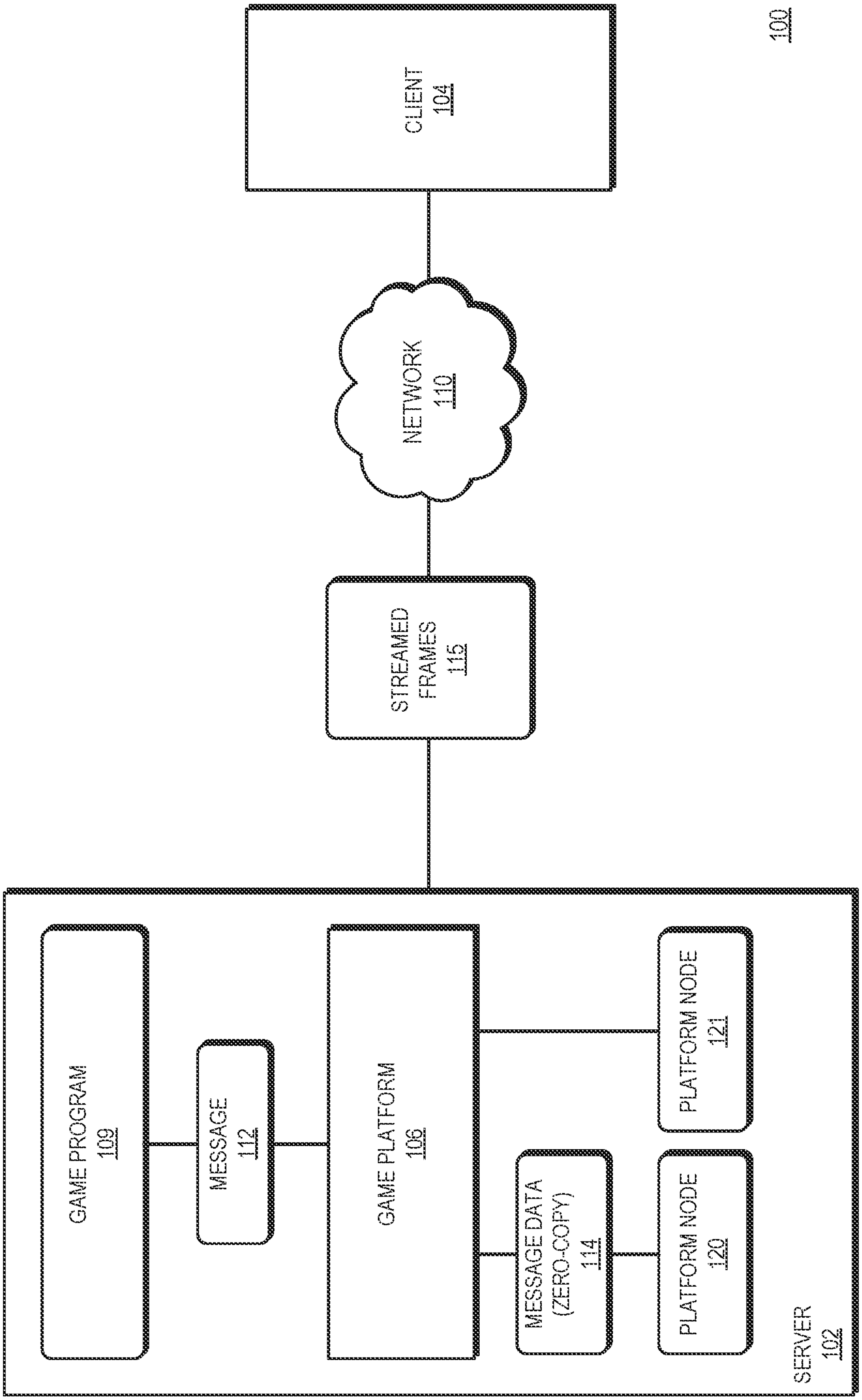
FIG. 1 is a block diagram of a game streaming system including a game platform that manages platform nodes to execute game operations, wherein the game platform supports low latency data transfer via zero-copy transfers in accordance with some embodiments.

FIGS. 1 through 6 illustrate techniques for implementing a game platform that, on behalf of a game program, manages platform nodes used to execute game operations, such as physics operations, artificial intelligence operations, and player messaging operations. FIG. 1 illustrates a block diagram of a game streaming system 100 in accordance with some embodiments. In the depicted example, the game streaming system 100 is generally configured to implement a game session of a video game by streaming a set of frames, designated streamed frames 115, from a server 102 to a client 104 via a network 110. The network 110 is a packet-switched network or any other type of network that can connect servers and client devices. For example, in some embodiments the network 110 is a wide-area network, such as the Internet, that includes one or more routers, communication towers (e.g., cellular communication towers), and other communication infrastructure to route packets between the server 102 and one or more clients such as the client 104. In other embodiments the network 110 represents a combination of networks, such as one or more wide-area networks, one or more local area networks, or any combination thereof.

The client 104 is an electronic device configured to receive and display the streamed frames 115. Accordingly, the client 104 can be any of a number of electronic devices such as a desktop or laptop computer, a video streaming device (e.g., a streaming dongle), a game console, a smartphone, and the like. The client 104 therefore includes components configured to support the reception and display of the streamed frames 115, such as one or more central processing units (CPUs), one or more graphics processing units (GPUs), one or more display panels, one or more network interfaces to connect to the network 110, and the like.

The server 102 is a computer device generally configured to provide compute services for one or more clients, including the client 104, via the network 110. Although the server 102 is illustrated at FIG. 1 as a single server, it will be appreciated that in other embodiments the server 102 represents multiple servers and associated computing resources. For example, in some embodiments the server 102 represents an edge data center including multiple servers connected via a high-speed communication framework. Further, in some embodiments the server 102 includes devices and components to support implementation of the compute services, such as one or more data stores, one or more accelerator devices, one or more high-speed communication networks, and the like.

The server 102 and client 104 are collectively configured to implement a game streaming session for a video game associated with a game program 109. In some embodiments, the game streaming session is initiated via a request from the client 104 to the server 102. For example, to initiate the game streaming session a user of the client 104 can enter a request via an input device such as a keyboard, game controller, and the like. The client 104 communicates the session initiation request to the server 102 via the network 110. In response to the session initiation request the server 102 initiates execution of the game program 109.

During execution and based on a collection of data referred to generally as a game state, the game program 109 employs the hardware of the server 102 to generate one or more image frames representing a virtual environment such as a game world. The server 102 communicates the image frames, as the streamed frames 115, to the client 104 over the network 110. The client 104 displays the streamed frames 115 to the user via a display device such as a display panel. In response viewing the displayed frames, the user can enter additional inputs via the input device (or other input devices) at the client 104, which communicates the inputs to the game program 109 executing at the server 102. Based on the user inputs, and based on a set of rules associated with the video game, the game program 109 updates the game state and generates additional frames for streaming to the client 104 based on the updated game state, allowing the user to enter additional inputs based on the additional streamed frames. The user continues interacting with the game program 109 in this way, thereby participating in the game session.

To support execution of the game program 109, the server 102 executes a game platform 106 and associated platform nodes (e.g., platform nodes 120 and 121). In some embodiments, the game platform 106 is a set of application program interfaces (APIs), libraries, and other software executing at the server 102, and is configured to provide game operation services to game program such as the game program 109. Each of the platform nodes associated with the game program 109 is configured to perform one or more services, referred to herein as a game operation, on behalf of a game program. Examples of game operations implemented by the platform nodes can include, in different embodiments, physics engine calculations, artificial intelligence (AI) operations, player messaging operations, and the like, or any combination thereof.

The game platform 106 performs at least two functions to provide services to a game program: 1) management of communications (e.g., messages and message data) between the game program 109 and the platform nodes; and 2) instantiation of new platform nodes based on requests from the game program 109. The game platform 106 thereby provides a configurable and scalable set of resources to perform game operations for the game program 109.

To illustrate, in some cases the game program 109 requires a specified game operation, such as a physics calculation to determine the movement of an in-game object. To initiate the game operation, the game program 109 issues a request to the game platform 106. In response, the game platform 106 determines if there is an available platform node to execute the requested game operation. If so, the game platform 106 sends an indication of the request and associated data to the corresponding platform node to execute the game operation, as described further below. In response to determining that there is not an available platform node to execute the requested game operation, the game platform 106 instantiates a new platform node by provisioning hardware resources of the server 102 to perform the requested operation, and instantiating one or more programs to execute the operation at the provisioned hardware.

Because the platform nodes are managed by the game platform 106, rather than the game program 109 itself, the game program 109 is isolated from, and does not directly manage, the particular resources used to perform a given game operation. This allows the resources employed for a particular game operation, on behalf of the game program 109, to be scaled or otherwise adjusted without redesigning or adjusting the game program 109 itself. For example, the hardware resources used to implement a particular platform node, and its associated game operations, can be distributed among multiple servers connected via a high-speed data network, requiring coordination of different operations at the distributed hardware resources. Such coordination, if implemented by the game program 109 directly, would introduce substantial overhead to the program, undesirably increasing game development time and resources. Furthermore, if the particular servers or other hardware used to implement a platform node were to change, the game program 109 would need to be redesigned or adjusted to account for each hardware change, again undesirably increasing the resources required to develop and maintain the game program 109. In contrast, by employing the game platform 106 to manage such functions as provisioning of platform nodes, instantiating new platform nodes, and communication between the game program 109 and the platform nodes, the resources available to the game program 109 to perform operations can be scaled, adjusted, and otherwise changed without demanding an expensive or onerous development or redesign of the game program 109.

Furthermore, in some embodiments the game platform 106 is configured to respond to requests (e.g., function calls) that are formatted or otherwise configured for an API associated with a non-distributed set of computer hardware. For example, in some cases the game platform 106 is configured to respond to function calls that are formatted for a smartphone operating system, a game console operating system, and the like. This allows the game platform 106 to provide the sophisticated operations implemented by distributed game hardware to game programs that are designed to execute in non-distributed systems such as smartphones and game consoles.

As noted above, the game platform 106 is configured to manage communications between the game program 109 and the platform nodes 120, 121. To reduce communication latency and improve the user experience with the game, in some embodiments the game platform 106 manages these communications using a zero-copy transfer technique to transfer data between the game program 109 and the platform nodes. As used herein, a zero-copy transfer technique refers to a data transfer technique wherein a source transfers data to a receiver without the receiver making a separate copy of the data being transferred. By employing such a zero-copy transfer technique, the game platform 106 reduces the overall communication overhead to communicate data and thus reduces communication latency.

To illustrate, in operation the game program 109 communicates with the platform nodes via messages (e.g., message 112). Examples of messages can include function calls, node configuration requests, status requests, and the like, or any combination thereof. Each message includes data (e.g., message data 114) to be transferred to one of the platform nodes 120, 121. The platform 106 receives the message 112, determines the platform node targeted by the message 112, and performs a zero-copy transfer to transfer the data to the identified platform node. In some embodiments, the game platform 106 performs the zero-copy transfer by changing the permissions associated with a buffer where the data is stored.

For example, in some embodiments the game platform initially assigns ownership of a buffer to the game program 109. The game program 109 writes data to the buffer and notifies the game platform 106, via the message 112, that the message data 114 is to be transferred to the platform node 120 for execution of a game operation. In response, the game platform 106 changes the owner of the buffer to the platform node 120 and prevents the game program 109 from writing any data to the buffer while the buffer is owned by the platform node 120. The message data 114 is thereby transferred to the platform node 120 without making a separate copy of that data, thereby reducing communication latency.

The platform node uses the message data 114 at the buffer to perform the operation requested by the message 112. Upon completing the operation, including any modification to the data stored at the buffer, the platform node 120 notifies the game platform 106 that the operation is complete. In response, the game platform 106 returns ownership of the buffer to the game program 109 and notifies the game program 109 that the requested operation is complete. The game platform 106 thereby performs a zero-copy transfer of the data back to the game program 109, further reducing data communication latency.

Figure 2:
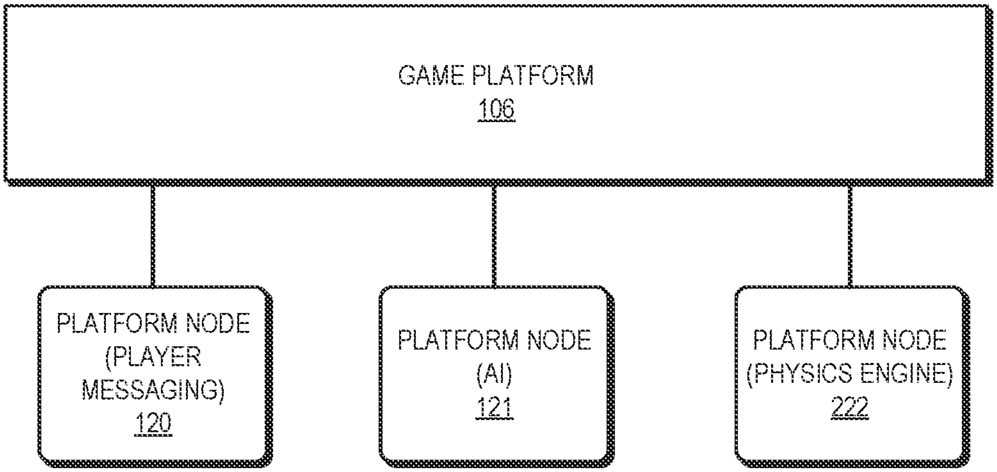
FIG. 2 is a block diagram of the game platform of FIG. 1 and associated platform nodes to perform game operations in accordance with some embodiments.

As noted above, the game platform 106 employs the different platform nodes to perform different types of game operations on behalf of the game program 109. An example is illustrated at FIG. 2 in accordance with some embodiments. In the depicted example the game platform has instantiated three different platform nodes designated platform node 120, platform node 121, and platform node 222. Each of the platform nodes 120, 121, and 222 are configured to perform a different class of game operations.

For example, in the illustrated embodiment, the platform node 120 is configured to perform player messaging operations, such as operations associated with an in-game player chat system (e.g., a voice chat system), an in-game texting system, and the like, or combination thereof. The platform node 121 is configured to perform AI operations, such as employing one or more machine learning models to generate aspects of game behavior, such as dialog responses, non-player character behaviors, simulated behavior of a human player, and the like. The platform node 222 is configured to perform operations associated with a physics engine, such as simulation of fluid dynamics, rigid body dynamics, soft body dynamics, or other physical systems, or any combination thereof.

In response to receiving a request fora game operation from the game program 109, the game platform 106 identifies the platform node designated to perform the requested operation and transfers data associated with the request operation from the game program 109 to the identified platform node. The game platform manages both the transfer of data and other aspects of communication between the game program 109 and the identified platform node, such as passing of arguments, configuration of the platform node to perform the requested operation, handling of exceptions or other error indications from the platform node, and the like. The game platform 106 thus provides a layer of abstraction between the game program 109 and the platform nodes. Among other functions, the layer of abstraction provided by the game platform 106 allows the different platform nodes to be adjusted and redesigned without corresponding redesign of the game program 109. For example, with respect to the platform node 121, the particular machine learning model implemented by the platform node can be modified and adjusted, including changes to required arguments, changes to the model input parameters and output parameters and the corresponding data formats, and the like, without requiring corresponding adjustments to the game program 109. Thus, the operations of the game program 109, and the corresponding game experience for the user, can be improved or changed over time without requiring expensive redesign or reconfiguration of the game program 109 itself.

Figure 3:
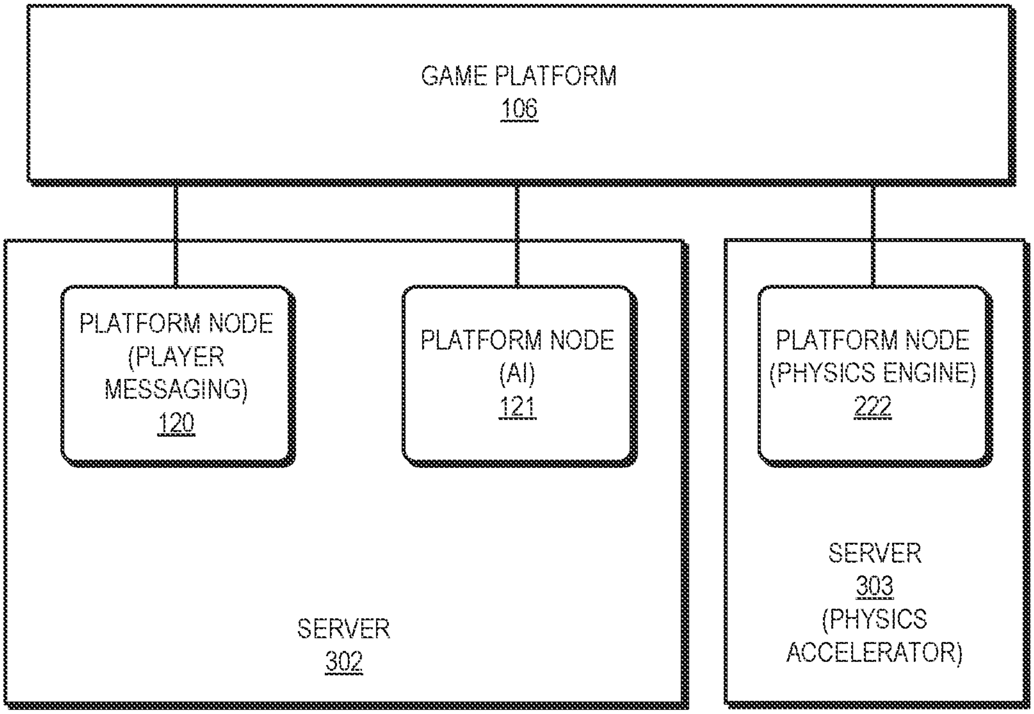
FIG. 3 is a block diagram illustrating an example of the game platform of FIG. 1 distributing game nodes over different hardware resources in accordance with some embodiments.

In addition, by isolating the platform nodes from the game program 109, the game platform 106 can support distributed execution of the operations associated with the platform nodes (that is, execution of the operations by distributed hardware resources) even when such distributed operations are not directly supported by the game program 109 itself. An example is illustrated at FIG. 3 in accordance with some embodiments. In the depicted example, the platform node 120 and platform node 121 are both implemented at a server 302. That is, the operations associated with the platform nodes 120 and 121 are executed using the hardware resources, including processors, input/output units, memory management units, and the like, of the server 302. In contrast, the platform node 222 is implemented at a different server 303. That is, the operations associated with the physics engine implemented by the platform node 222 are executed at the hardware resources of the server 303. Further, in some embodiments the server 303 is a physics engine accelerator that includes hardware resources such as processing units, memory management units, input/output units, and the like, that have been specially designed or configured to execute the physics engine operations of the platform node 222. Thus, in the illustrated example, the different platform nodes can be assigned to the hardware resources that are best suited to execute the corresponding operations.

Further, because the hardware that implements the different platform nodes is managed by the game platform 106, rather than by the game program 109, the hardware resources assigned to a given platform node can be modified over time without requiring corresponding modification or redesign of the game program 109 itself. For example, in some embodiments, the platform node 121 can be reassigned to be implemented at a new server (not shown), further distributing the overall operations of the platform nodes among different servers. Because the game program 109 communicates with the game platform 106, rather than directly with the platform nodes, the reassignment of the platform node 121 is not visible to the game program 109, and in particular does not require the game program 109 to be modified or redesigned.

It will be appreciated that in some embodiments, the operations of a given platform node can be distributed over multiple servers, including distributed over multiple hardware accelerators. For example, in some embodiments the operations of the AI platform node 121 are distributed among multiple AI accelerators, with each AI accelerator configured to execute a different neural network or machine learning model.

Figure 4:
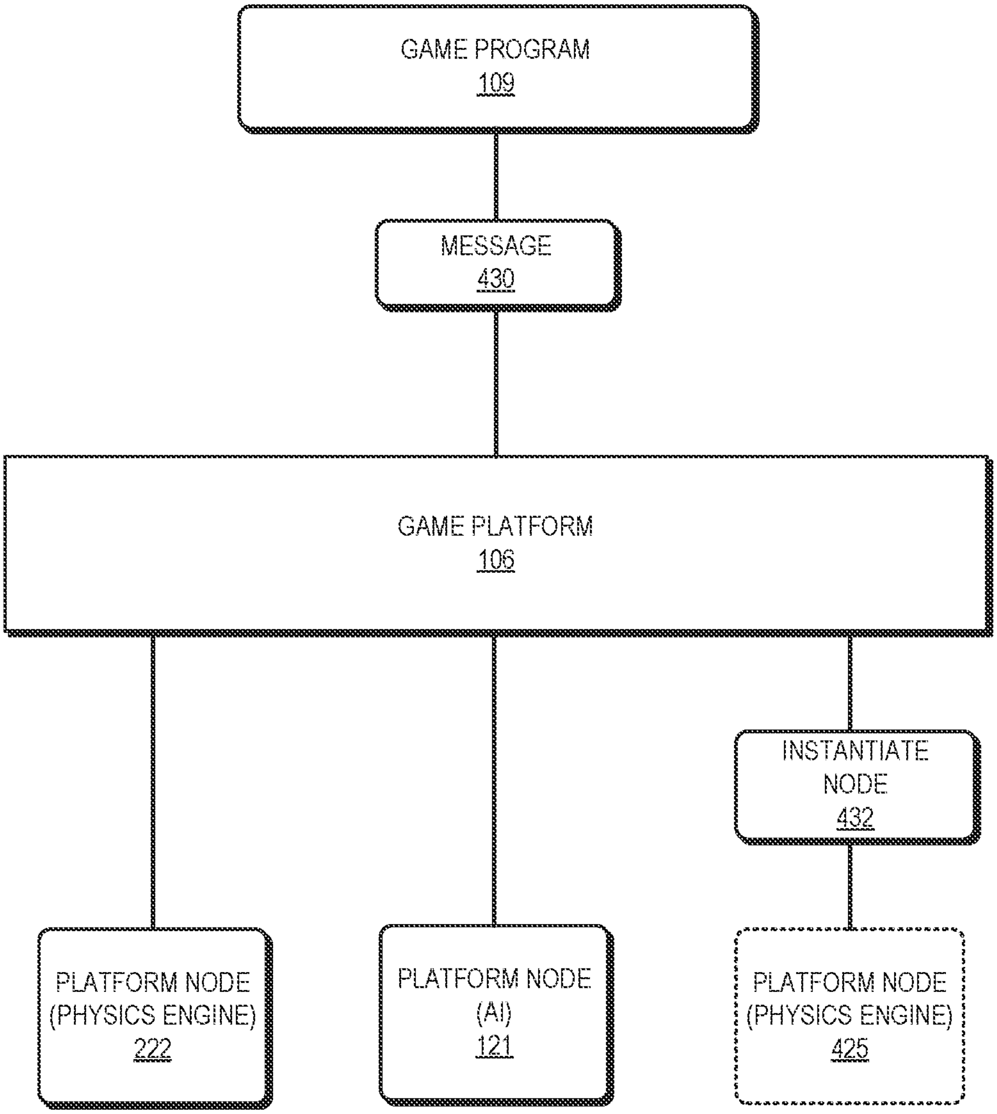
FIG. 4 is a block diagram illustrating the game platform of FIG. 1 instantiating an additional game node in response to a message from a game program in accordance with some embodiments.

In some embodiments, the game platform 106 is configured to instantiate additional platform nodes based on the changing demands of the game program 109. An example is illustrated at FIG. 4 in accordance with some embodiments. In the illustrated example, the game platform 106 has previously instantiated two platform nodes: platform node 222, to perform physics engine operations, and platform node 121, to perform AI operations. The game program 109 sends a message 430 the game platform 106 requesting physics engine operations. In response to the message 430, the game platform 106 determines that the platform node 222 is not available to perform the requested physics engine operations. For example, in some embodiments the game platform 106 determines that the platform node 222 is occupied with performing other physics engine operations and will not be able to perform the operations requested by the message 430 within a threshold period of time. In other embodiments, the game platform 106 determines that the physics operations requested by the message 430 are operations associated with a physics model that is not implemented by the physics engine of the platform node 222.

In response to determining that the platform node 222 is not able to perform the operations requested by the message 430, the game platform 106 executes an instantiate node operation 432. To execute the instantiate node operation 432, the game platform 106 first provisions hardware at the server 102 or other server device to execute operations for a new platform node 425. For example, in some embodiments the server 102 includes resources such as processor cores, processor cycles, processing units, memory locations, and the like, or any combination thereof that can be assigned by the game platform 106, or by an operating system, to different ones of the platform nodes 222, 121, and other platform nodes. To provision hardware for the additional platform node 425, the game platform 106 reserves a specified amount of these resources to perform the corresponding operations. For example, the game platform 106 can reserve a specified number of processor core cycles of a given processing unit to perform the operations of the platform node 425. The game platform 106 then begins executing the game operations of the platform node 425, thereby instantiating the node.

Thus, in the example of FIG. 4 the game platform 106 secures additional resources to perform game operations for the game program 109 based on the changing demands of the program. This allows the game program 109 to perform sophisticated game operations without implementing the corresponding overhead of managing the sophisticated game operations. For example, as new players are added to a game session of the video game associated with the game program 109, the game platform 106 can secure additional hardware resources to accommodate the game operations associated with the additional players, and can manage provision and de-provisioning of those hardware resources, allowing the game program 109 to accommodate an increased number of players while maintaining relatively low game management overhead, thereby improving the game experience.

Figure 5:
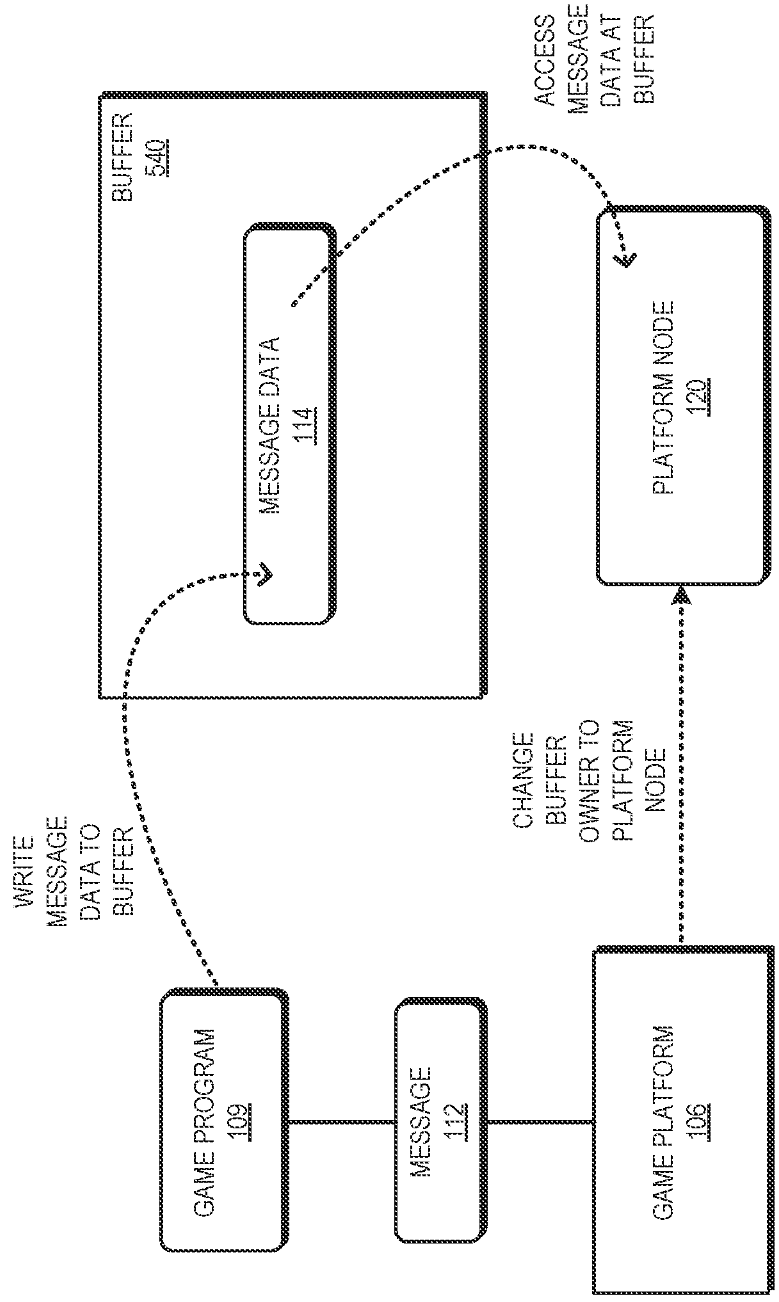
FIG. 5 is a block diagram illustrating an example of the game platform of FIG. 1 transferring data from a game program to a platform node via a zero-copy transfer operation in accordance with some embodiments.

As explained above, in some embodiments, in order to provide a satisfying user experience, it is desirable for the game platform 106 to transfer data between the game program 109 and the platform nodes with a relatively small amount of latency. This allows a game platform nodes to quickly respond to messages from the game program 109 which can be beneficial in many cases, such as for games requiring rapid responses to player inputs, such as games that require rapid response to player inputs in order to allow the players to be competitive within the game. Accordingly, to support low-latency communications, in some embodiments the game platform 106 employs a zero-copy transfer technique to transfer data between the game program 109 and the platform nodes. An example is illustrated at FIG. 5 in accordance with some embodiments.

In the illustrated example, the game program 109 sends a message 112 to the game platform 106 requesting game operations to be performed by the platform node 120. For example, in some embodiments the message 112 requests the platform node 120 to perform physics calculations associated with the physics engine. It is assumed for purposes of the example of FIG. 5 that the game operations requested by the message 112 require access to specified data, designated message data 114. For example, in some embodiments the message data 114 represents coordinates and other characteristics associated with objects for which the physics calculations are to be performed.

To transfer the message data 114, the game program 109 stores the message data 114 at a buffer 540. In some embodiments, the buffer 540 is a dedicated buffer for communication of data to the platform nodes. In other embodiments, the buffer 540 is a specified region of memory already employed by the game program 109 to store the data corresponding to the message data 114. For example, in some embodiments the buffer 540 is a region of memory used by the game program 109 to store the coordinates and other object characteristics used for physics calculations and is not a dedicated data communication buffer.

To transfer the message data 114 in response to the message 112, the game platform 106 changes the owner of the buffer 540 to the platform node 120. While the platform node 120 is the owner of the buffer 540, the game program 109 is not permitted to access any data stored at the buffer 540. For example, in response to a request from the game program 109 to the game platform 106 to modify or write data to the buffer 540 while the platform node 120 is the owner of the buffer 540, the game platform 106 indicates to the game program 109 that modifying or writing data to the buffer 540 is not allowed, and the game platform 106 does not execute the request to write or modify the data.

The platform node 120 accesses the message data at the buffer 540 to perform the operations requested by the message 112. For example, in some embodiments the game platform node 120 executes the physics calculations as requested by the message 112. Upon completing the requested operations, the platform node 120 notifies the game platform 106. In response, the game platform 106 returns ownership of the buffer 540 to the game program 109 and notifies the game program 109 that the calculations are complete. The game program 109 can then access the message data 114, as modified by the operations of the platform node 120, at the buffer 540.

Thus, in the example of FIG. 5, the data is transferred between the game program 109 and the platform node 120 using a zero-copy technique—that is the data is transferred without creating separate copies of the data for the game program 109 and the platform node 120. In contrast, conventional game data transfer techniques typically proceed through a network stack of an operating system, wherein the network stack requires one or more copies of the data to be made prior to executing to the data transfer. For example, in many cases the data must be copied to a buffer associated with the network stack prior to the data being transferred. The associated data copy operations increase communication latency that can negatively impact the game experience. In contrast, by using the zero-copy transfer technique, the game platform 106 is able to transfer data between the game program 109 and the platform nodes 120 with relatively little latency, thereby improving the user experience.

Figure 6:
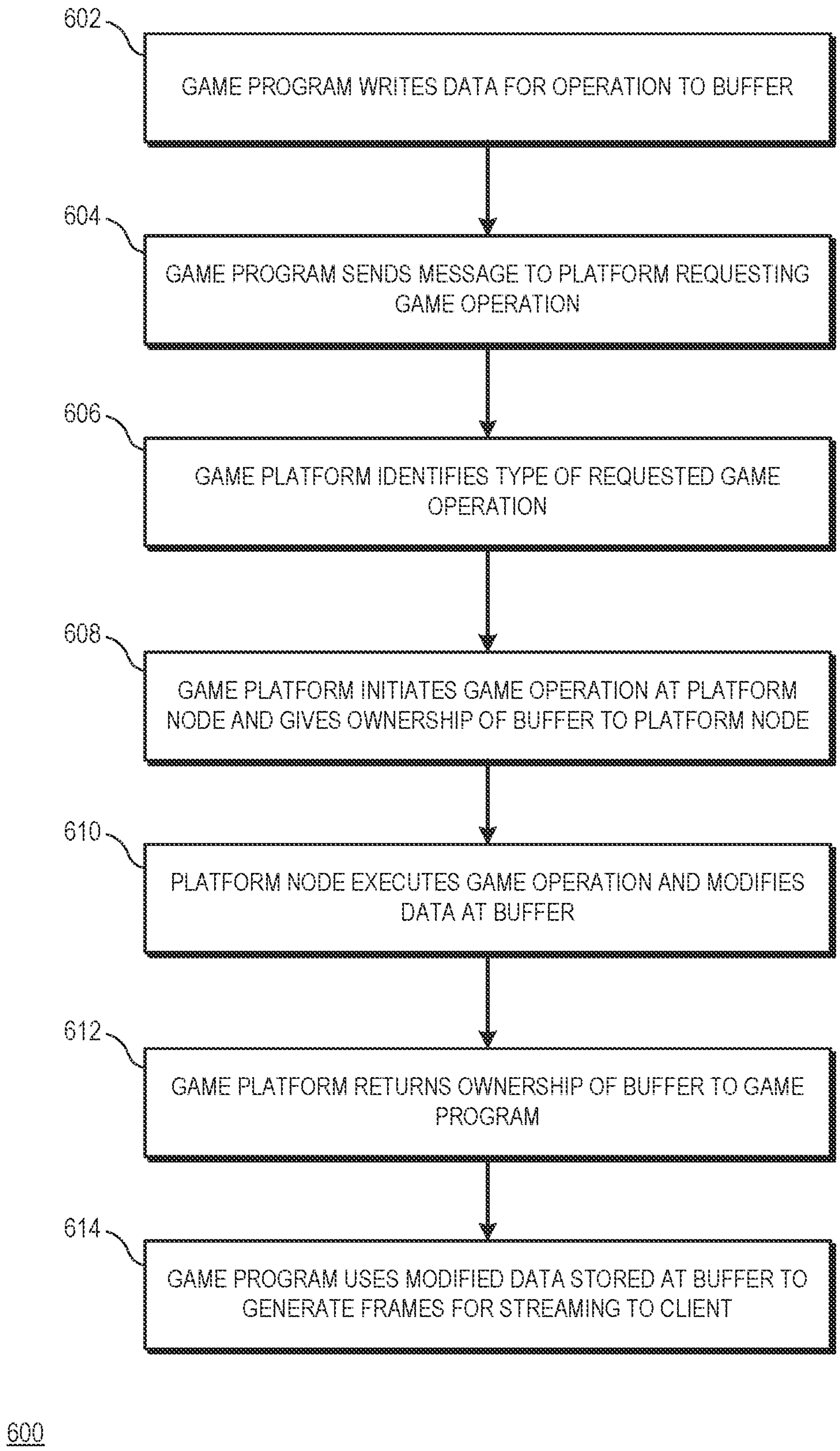
FIG. 6 is a flow diagram of a method of transferring data between the game program and a platform node of a game platform via zero-copy transfers in accordance with some embodiments.

FIG. 6 illustrates a flow diagram of a method 600 of transferring data between the game platform and one or more game platform nodes using a zero-copy technique in accordance with some embodiments. For purposes of description, the method 600 is described with respect to an example implementation at the game streaming system 100 of FIG. 1. At block 602, the game program 109 writes data that is to be transferred to a buffer, such as buffer 540 of FIG. 5. At block 604, the game program 109 sends a message, such as message 112, to the game platform 106 requesting a specified game operation, such as a player messaging operation, an AI operation, or a physics engine operation. It is assumed that the requested game operation is to use the data that was stored at the buffer 540 at block 602 above.

At block 606, the game platform 106 identifies the type of requested game operation. For example, the game platform 106 determines whether the game operation requested by the message 112 is a physics engine operation, and AI operation, or a player messaging operation. At block 608, the game platform 106 sends a command to a game platform node corresponding to the type of requested game operation identified at block 606. In addition, the game platform 106 assigns ownership of the buffer 540 to the selected game platform node.

At block 610, the selected platform node executes the requested game operation and, in the course of executing the game operation, modifies the data at the buffer 540. At block 612, upon completing the requested game operation, the selected platform node notifies the game platform 106. In response, the game platform 106 returns ownership of the buffer 540 to the game program 109. At block 614, the game program 109 uses the modified data stored at the buffer 540 to generate one or more of the streaming frames 115 for streaming to the client 104.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

receiving a first message from an executing program, the first message comprising first data; and providing the first data to a first node of a first platform via a first zero-copy transfer, the first node associated with a first operation that is one of a physics engine operation, an artificial intelligence operation, or a messaging operation.

2. The method of claim 1, wherein the first zero-copy transfer comprises:

the first platform assigning ownership to the first node to access a first buffer.

3. The method of claim 2, further comprising:

storing the first data at the first buffer for the first zero-copy transfer.

4. The method of claim 2, further comprising:

the first platform preventing access by the executing program to the first buffer while the first node executes the first operation with using the first data.

5. The method of claim 2, further comprising:

providing the first data to a second node of the first platform via a second zero-copy transfer, the second node associated with a second operation different from the first operation.

6. The method of claim 5 wherein the second zero-copy transfer comprises:

the first platform assigning ownership to the second node to access the first buffer.

7. The method of claim 1, wherein the first node comprises a hardware accelerator configured to execute the first operation.

8. The method of claim 1, further comprising:

receiving a second message from the executing program, the second message comprising second data; and providing the second data to a second node of the first platform via a second zero-copy transfer, the second node associated with a second operation that is different than the first operation.

9. The method of claim 1, further comprising:

instantiating a plurality of operation nodes at the first platform including the first node, each of the plurality of operation nodes associated with a different operation;

in response to receiving, from the executing program and at the first platform, the first message including the first data, transferring the first data to the first node of the plurality of operation nodes via the first zero-copy transfer.

10. A game platform, comprising at least one processor and at least one memory embodying a set of executable instructions, the set of executable instructions to manipulate at least one processor to perform the method of claim 1.

11. A method, comprising:

instantiating a plurality of operation nodes at a first platform, each of the plurality of operation nodes associated with a different operation, at least one of the different operations being a physics engine operation, an artificial intelligence operation, or a messaging operation;

in response to receiving at the first platform, from an executing program, a first message including first data, transferring first data to a first node of the plurality of operation nodes via a zero-copy transfer.

12. The method of claim 11, further comprising:

instantiating a second node of the plurality of operation nodes in response to the first message.

13. A non-transitory computer readable medium embodying a set of executable instructions, the set of executable instructions to manipulate at least one processor to:

receive a first message from an executing program, the first message comprising first data; and provide the first data to a first node of a first platform via a first zero-copy transfer, the first node associated with a first operation that is one of a physics engine operation, an artificial intelligence operation, or a game messaging operation.

14. The non-transitory computer readable medium of claim 13, wherein the set of executable instructions manipulate the processor to:

receive a second message from the executing program, the second message comprising second data; and provide the second data to a second node of the first platform via a second zero-copy transfer, the second node associated with a second operation.

15. The non-transitory computer readable medium of claim 13, wherein the first zero-copy transfer comprises:

the first platform assigning permission to the first node to access a first buffer.

16. The non-transitory computer readable medium of claim 15, wherein the set of executable instructions manipulate the processor to:

store the first data at the first buffer for the first zero-copy transfer.

17. The non-transitory computer readable medium of claim 15, wherein the set of executable instructions manipulate the processor to:

block access by the executing program to the first buffer while the first node executes the first operation with using the first data.

18. The non-transitory computer readable medium of claim 15, wherein the set of executable instructions manipulate the processor to:

providing the first data to a second node of the first platform via a second zero-copy transfer, the second node associated with a second operation different from the first operation.

19. The non-transitory computer readable medium of claim 18, wherein the second zero-copy transfer comprises:

the first platform assigning permission to the second node to access the first buffer.

20. The non-transitory computer readable medium of claim 13, wherein the first node comprises a hardware accelerator configured to execute the first operation.

* * * * *